(12) United States Patent
Nikitin

(10) Patent No.: US 7,526,856 B2
(45) Date of Patent: May 5, 2009

(54) METHOD FOR FABRICATING A MAGNETIC HEAD USING A FERROFLUID MASK

(75) Inventor: Vladimir R. Nikitin, Campbell, CA (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 444 days.

(21) Appl. No.: 11/391,069

(22) Filed: Mar. 27, 2006

(65) Prior Publication Data

US 2007/0220739 A1 Sep. 27, 2007

(51) Int. Cl.
G11B 5/187 (2006.01)
B44C 1/22 (2006.01)

(52) U.S. Cl. .............. 29/603.12; 29/603.13; 29/603.15; 29/603.16; 29/603.18; 438/717; 438/736; 204/192.34; 216/22; 216/42; 216/47; 216/48; 360/125.04; 360/125.25

(58) Field of Classification Search .............. 29/603.12, 29/603.13, 603.15, 603.16, 603.18; 438/717, 438/736; 204/192.34; 216/22, 41, 42, 47, 216/48, 94; 360/125.04, 122, 125.17, 125.22, 360/125.25

See application file for complete search history.

(56) References Cited

U.S. PATENT DOCUMENTS

| 4,946,613 | A | 8/1990 | Ishikawa |
| 5,916,641 | A | 6/1999 | McArdle et al. |
| 6,174,449 | B1 | 1/2001 | Alwan et al. |
| 6,180,226 | B1 | 1/2001 | McArdle et al. |
| 6,402,876 | B1 | 6/2002 | McArdle et al. |
| 6,423,172 | B1 | 7/2002 | McArdle et al. |
| 6,526,649 | B2 * | 3/2003 | Ohkawara ............ 29/603.18 X |
| 6,584,676 | B1 | 7/2003 | Chang et al. |
| 2005/0073775 | A1 | 4/2005 | Chang et al. |

FOREIGN PATENT DOCUMENTS

JP 11134618 A * 5/1999

OTHER PUBLICATIONS

Lin et al., "Effects of Current and Frequency on Write, Read, and Erase Widths for Thin-Film Inductive and Magnetoresistive Heads", IEEE Transactions on Magnetics, vol. 25, No. 1, Jan. 1990, pp. 710-715.*
Yellen, Friedman and Barbee, "Programmable Self-Aligning Ferrofluid Masks for Lithographic Applications," IEEE Trans. Mag. vol. 40, No. 4, Jul. 2004.
Anonymous, Ferrofluid Patterning Optical Images, Internet ref. http://www.pages.drexel.edu/~bby22/ferrofluid_patterning accessed on Oct. 10, 2004.

* cited by examiner

Primary Examiner—A. Dexter Tugbang
(74) Attorney, Agent, or Firm—G. Marlin Knight

(57) ABSTRACT

A method for fabricating sliders (magnetic heads) with a recessed surface around a magnetic feature such as the active components of the write head on the air-bearing surface (ABS) is described. An embodiment of the method applies a positive photoresist to the exposed ABS surface, a magnetic field is applied, then liquid ferrofluid is applied on top of the photoresist. The pole pieces around the write gap will interact with the applied magnetic field so that the field gradient is highest around the write gap and the mobile ferrofluid will preferentially collect in the areas of the surface having the highest magnetic field gradient. The opaque magnetic particles in the ferrofluid form an optical ferrofluid mask over the photoresist around the write gap. The unmasked surface of the slider is milled which results in the recession of material around the write gap.

20 Claims, 3 Drawing Sheets

METHOD FOR FABRICATING A MAGNETIC HEAD USING A FERROFLUID MASK

FIELD OF THE INVENTION

The invention relates to the field of magnetic data storage devices and more particularly to methods for fabricating magnetic heads for use in magnetic data storage devices and even more particularly to methods for fabricating magnetic heads with recessed surfaces around the active writing elements on the ABS.

BACKGROUND OF THE INVENTION

Selected components in a typical prior art magnetic storage device (disk drive) 10 are illustrated in FIG. 1 in simplified block form. Although only one disk 16 and one slider 11 are shown, there may be multiple disks in a drive and typically there are two sliders per disk, i.e., one for each surface of the disk. This disk drive comprises a thin film magnetic disk 16 for recording data, a slider or magnetic head 11 that carries out the reading and writing of data in tracks on the magnetic disk 16. The disk is attached to spindle 18 which is rotated by spindle motor 14. The slider includes a read head 12 and a write head 19 which are attached to suspension 13. The disk 16 includes a plurality of thin films 17 in which magnetic transitions are recorded. Sliders are fabricated in sets on a wafer using semiconductor-type processing methods. Typically the read head is formed first, but the write head can also be fabricated first. The conventional write head is inductive. The layers and structures in the sliders are first deposited on the wafer, then the wafer is sliced into rows or individual sliders to expose the transducer elements. The cut surfaces of the sliders are typically lapped and a protective overcoat is deposited on the air-bearing surface. Typically, a slider is formed with an aerodynamic pattern of protrusions (air-bearing features) on the air-bearing surface (ABS) which enable the slider to fly at a constant height close to the disk during operation of the disk drive. The recording density of a magnetic disk drive is limited by the distance between the read and write heads and the magnetic media. Smaller spacing or "fly height" is desired to increase the recording density. The magnetic domains in the media on can be written longitudinally or perpendicularly.

In a disk drive using perpendicular recording, the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head.

In U.S. Pat. No. 6,584,676 to Chang, et al., Jul. 1, 2003, a method is described for finishing a trimmed pole tip read/write head that includes a substrate with a pole tip structure having a shield, a shield/pole, and an outer pole. A gap region separates the pole and the shield/pole. First, pole tip trimming is performed to the read/write head to remove matter from the shield/pole, the pole, and the gap region. This defines a bridge composed of inward-facing extensions of the pole and shield/pole interconnected by an intervening region. This bridge separates recessed "trenches," each formed by removing a contiguous mass from the shield/pole, the gap region, and the pole. Next, an overlayer is applied over the pole tip structure, filling the recessed trenches. The coated structure is then trimmed to remove all coating material overlying the shield/pole and pole. Trimming is continued to additionally remove a top layer of the protrusions of the pole and shield/pole to remove any rounded edges created by pole tip patterning, resulting in a more distinct write head. The refilled trenches of the recessed areas impart improved resistance to corrosive attack, to head-crashes from the release of accumulated debris, and to mechanical damage of the trimmed pole-tip structure.

In published U.S. patent application 20050073775 by Chang, et al., Apr. 7, 2005 a process of milling pole tip in a write head for longitudinal recording is described. As a first step a thin film protective layer is deposited upon the pole tip on the ABS surface. Following the deposition of the protective layer 100, the FIB tool is utilized to mill the areas within the milling boxes as was done in the prior art. The improvement that results from the protective layer of the invention is a reduction in the rounding of the edges. Following the FIB milling step, the protective layer is removed from the head by such means as a chemical etch, burnishing or other generally known methods.

Ferrofluids are liquids with ferromagnetic particles suspended in them. One use of ferrofluids is to visualize the recorded pattern on magnetic disks or for magnetic flaw detection. U.S. Pat. No. 4,946,613 to Ishikawa Aug. 7, 1990 describes photosetting ferrofluid compositions that include photosetting resin. In one embodiment the carrier itself includes a photosetting resin. When the photosetting ferrofluid is used for magnetic flaw detection or to visualize a magnetically recorded pattern, the ferrofluid is first applied onto the surface of the article on which a magnetic field has been formed. The ferrofluid is then urged to swell by being attracted either by the leaked magnetic flux caused by the defective region or by the variation in the magnetic flux of the recorded magnetic signal. This forms a pattern of the ferrofluid corresponding to the pattern of the magnetic flux. Next the article is exposed to a beam of light having a specific wavelength sufficient to set or harden the photosetting resin fixing the pattern of the ferrofluid formed by the magnetic flux. Where sharp photographic images must be obtained, the ferrofluid uses a carrier of low viscosity. By virtue of the use of a low viscosity carrier, the ferrofluid swells up with steep inclinations. Subsequently, a light beam of a specific wavelength sufficient for setting the photosetting resin added in the ferrofluid as a pattern fixing agent is directed to the fluid so as to fix the pattern formed by the ferrofluid.

The use of ferrofluids have also been described in connection with the creation of self-aligning masks for optical masking and chemical masking. Yellen, et al. described the use of nanometer sized ferrofluids with alignment marks on a substrate and an applied external field. ("Programmable Self-Aligning Ferrofluid Masks for Lithographic Applications", IEEE Transactions On Magnetics, vol. 40, no. 4 July 2004.) When the external field is applied normal to the plane of the substrate the ferrofluid particles are preferentially deposited over one of the poles of ferromagnetic islands which are used as the alignment marks.

SUMMARY OF THE INVENTION

One embodiment of the invention is a method for fabricating sliders (magnetic heads) with a recessed surface around a magnetic feature such as the active components of the write head on the air-bearing surface (ABS). An embodiment of the method applies a positive photoresist to the exposed surface with the write head elements on the ABS after the sliders have been cut from the wafer into rows or individual sliders. A magnetic field is preferably applied perpendicular to the ABS surface, then a liquid ferrofluid is applied on top of the photoresist. The magnetic field is applied by a permanent magnetic positioned behind the sliders in one embodiment. The main pole piece and the return pole piece around the write gap will interact with the applied magnetic field to make the field gradient highest around the write gap, so that the mobile ferrofluid will preferentially collect in the areas of the surface having the highest magnetic field gradient. After the ferrofluid is allowed to dry the magnetic field can be removed. The opaque magnetic particles in the ferrofluid form an optical ferrofluid mask over the photoresist above the write gap. The slider is then exposed to the appropriate light for the photoresist. The ferrofluid mask around the write gap prevents the underlying photoresist from being affected by the light. The exposed photoresist is then developed and removed leaving the masked area of photoresist around the write gap in place. The surface of the slider is milled which results in the recession of material around the gap. The photoresist mask is then removed. Optionally a protective overcoat can be applied on the slider surface. The invention can be used with a variety of write head designs. In an example described below the write head structure at the ABS includes the main pole, the write gap and a high moment cap which is part of the return pole structure.

DETAILED DESCRIPTION OF THE INVENTION

Figure 1:
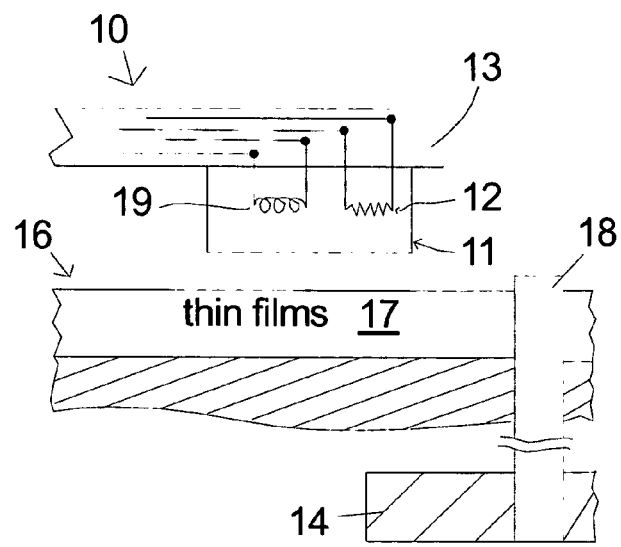
FIG. 1 illustrates relevant components in a typical prior art disk drive in simplified form.
Figure 2:
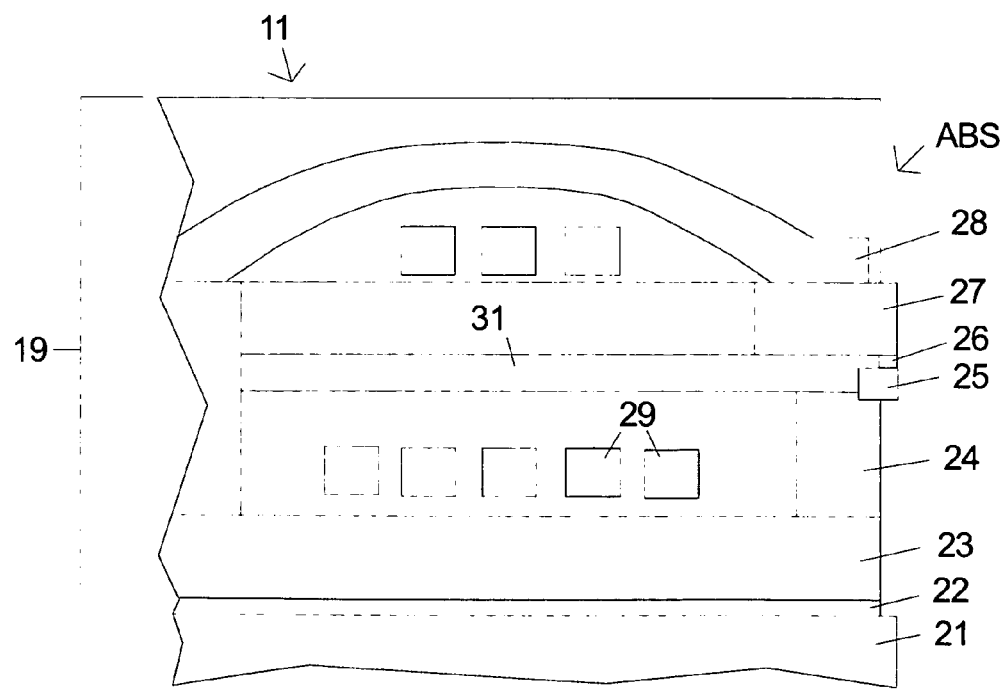
FIG. 2 illustrates a section view, perpendicular to the ABS, of selected components of a slider design that can be fabricated using the process of the invention.

The method of the invention has general applicability to fabrication of magnetic heads which have ferromagnetic structures on the surface that concentrate ferrofluid in an applied magnetic field; therefore, the invention can be used with any write head design. The embodiment of the invention described below uses a write head for perpendicular recording with a particular design that includes a pedestal and a high moment cap as part of the return pole. FIG. 2 illustrates a partial section of a particular embodiment of a slider 11 having a write head 19 which can be fabricated using the method of the invention. The section is perpendicular to the air-bearing surface (ABS) on the right of the figure. With the exception of the S2 shield 21 the read head is not shown. Any read head design can be used with the invention. The P1 pole 23 of the write head is separated from the S2 shield by gap layer 22. The pedestal pole piece 24 extends from P1 to the pedestal cap 25 which is made of a high moment material. The write gap 26 separates the pedestal cap 25 from the main pole piece 27. The write head includes P3 pole piece 28 and coil 29. The embodiment shown in FIG. 2 has the surfaces around the pedestal cap 25, write gap 26 and main pole piece 27 recessed in order to bring the active pole elements closer to the disk surface during operation. The method of the invention described below deals with the process of forming the recessed area. Except for the recessed areas, the structures of the head are formed according to the prior art.

Figure 3:
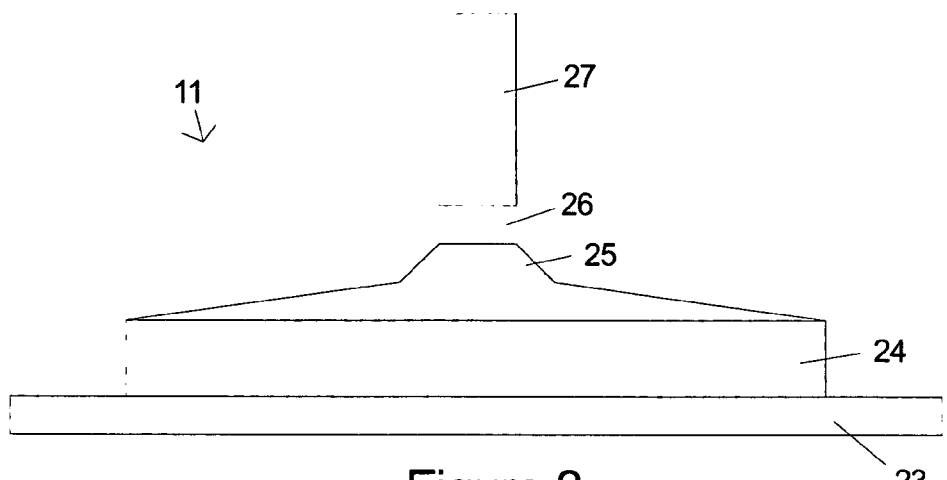
FIG. 3 illustrates a view of the ABS of a slider prior to being processed according to the invention.
Figure 4A:
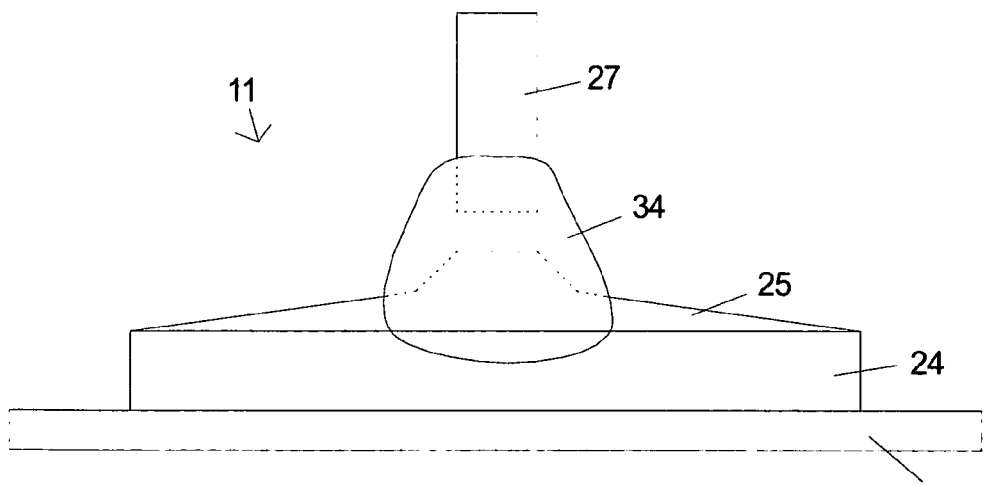
FIG. 4A illustrates a view of the ABS of a slider after the mask on the ABS has been patterned according to the invention.
Figure 4B:
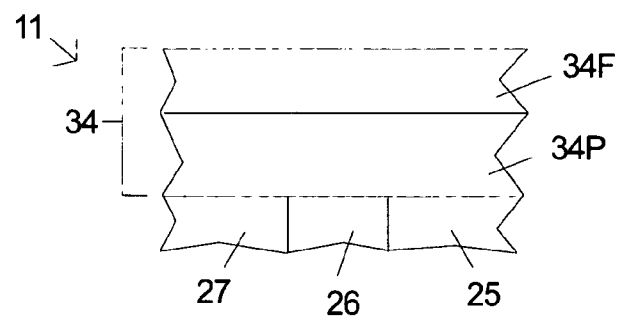
FIG. 4B illustrates a section view of the slider, perpendicular to the ABS, after the mask on the ABS has been patterned according to the invention.

FIG. 3 illustrates an ABS view of the slider prior to being processed by the invention. The slider 11 has been cut from the wafer to expose the surfaces depicted in FIG. 3. If lapping is included in the process of making the slider, it must be completed prior to beginning the process of recessing the surfaces according to the invention. FIG. 4A illustrates the ABS of the slider after mask 34 has been patterned using photoresist and ferrofluid according to the invention. FIG. 4B illustrates a section view of the slider, perpendicular to the ABS, after the mask 34 on the ABS has been patterned according to the invention. FIG. 4B shows that the mask 34 includes a photoresist portion 34P and a ferrofluid mask portion 34F.

Figure 5:
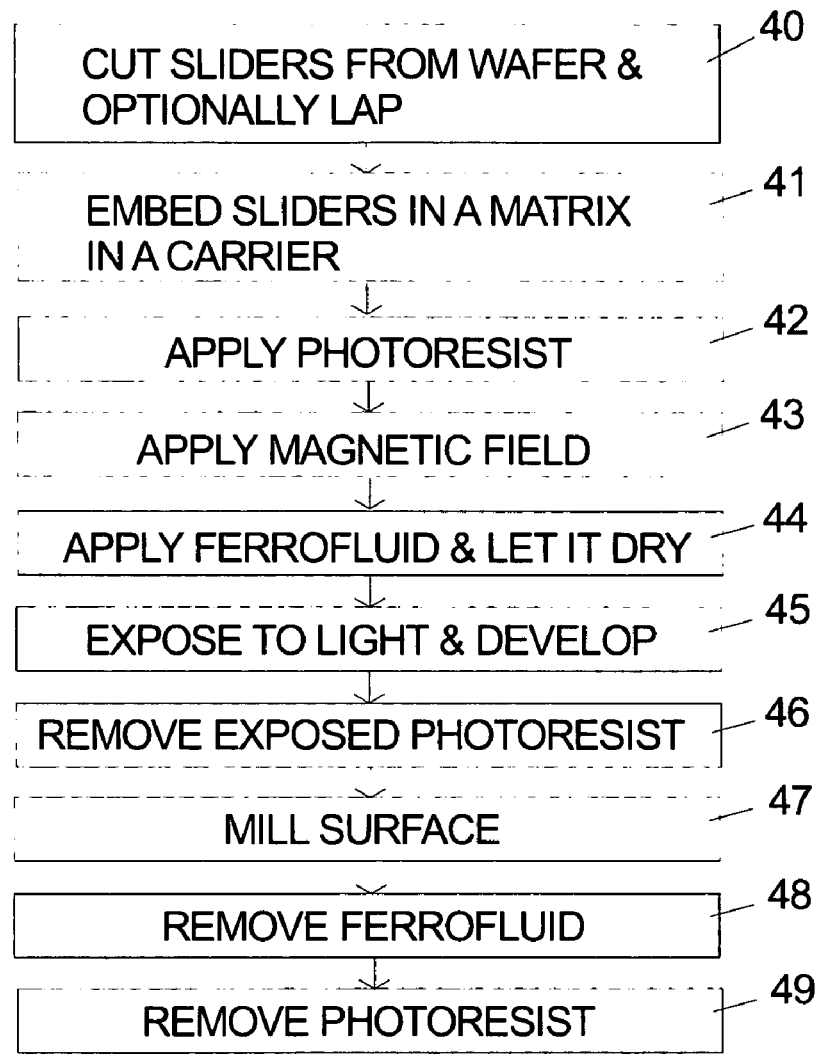
FIG. 5 is a flowchart of steps in a method embodying the invention.

The thin film structures of the read and write head are formed on a wafer according to the prior art. FIG. 5 is a flowchart of a method embodying the invention. The sliders are cut from the wafer and optionally lapped 40. The sliders can be cut into rows or individual sliders. The process is preferably carried out in a clean-room. The sliders are preferably placed in a carrier and fixed in place by forming a matrix of a glue-like material around them 41. The matrix is formed by prior art methods and will typically include pouring a liquid around the sides of the sliders. The glue-like liquid will then harden to firmly hold the sliders in position. The tops of the sliders have the exposed thin film features. The tops of the sliders must remain exposed for processing. A positive photoresist is applied to the set of sliders in the carrier preferably by spinning on the liquid photoresist 42. The photoresist will eventually become the portion of the mask shown as 34P in FIG. 4B.

A magnetic field is applied to the sliders 43. The magnetic field is oriented perpendicular to the surface of the sliders having the thin film magnetic features. One method of applying this field is to place a permanent magnet behind the carrier. The permanent magnet needs to be large enough to apply a reasonably uniform magnetic field to each of the sliders in the carrier. An electromagnetic apparatus can also be used to apply the field. The ferrofluid is then applied to the surface and allowed to dry 44. There are numerous types of ferrofluids that are commercially available. Any colloidal suspension of the $Fe_2O_3$ particles with diameters about 10 nm which are surface passivated and are a colloidal suspension in water-, alcohol-, or glycerin-based solution can be used. One family of commercially available ferrofluids that are useful for this application are the aqueous-based EMG-series ferrofluids from Ferrotec, 40 Simon Street, Nashua, N.H. 03060-3075. The ferrofluid can be applied by any appropriate means including being spun on or applied with pen-sponge.

The ferrofluid will preferentially collect in the areas with the highest magnetic field gradient. For a typical magnetic head the gradient will be highest in the area of the write gap due to inherent design of the write head. A smaller amount of ferrofluid will collect in the read gap where the gradients are weaker. The ferrofluid in the read gap is not a problem, since it is acceptable for this area to be masked and not to be milled.

Once the ferrofluid is dry, the photoresist is ready for exposure which can be achieved by flood lighting. The ferrofluid over the write gap masks the underlying photoresist from exposure. The photoresist is then developed 45. The exposed photoresist is removed leaving only the areas masked by the ferrofluid 46. The surface of the slider around the mask is milled using one of the available techniques such as reactive-ion-etching (RIE) or ion-milling. The depth of material removed can be controlled by timing. For the slider design in this example, a recession depth of about 0.3 microns is reasonable.

The ferrofluid mask on top of the photoresist has different characteristics than the underlying photoresist, so a separate step in the process may be needed to remove the ferrofluid first 48. Water or alcohol may be sufficient to remove the dry ferrofluid, but the exact technique needed will be determined by the characteristics of the particular ferrofluid used. The photoresist can then be removed by chemical stripping or other prior art means 49. The prior art processing of the slider is resumed at this point and can include deposition of an overcoat.

Figure 6:
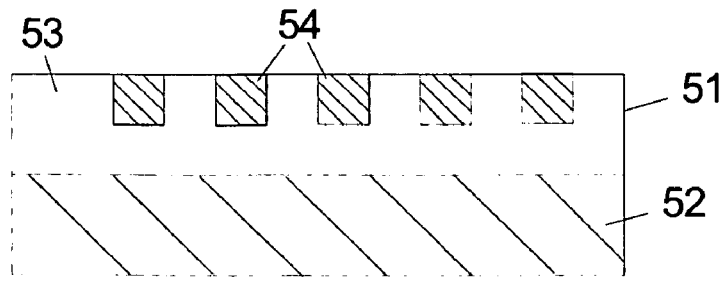
FIG. 6 illustrates a slider carrier and permanent magnet used in an embodiment of the invention.

The invention can be used with a variety of fixture, carrier and magnetic arrangements. FIG. 6 illustrates a simple configuration of a carrier 51 which is in contact with permanent magnet 52 for the phase of the process when the ferrofluid is being applied and dried. The sliders 54 can be rows or single sliders which are embedded in matrix material 53 which can be a glue-like material which is poured around the sliders and hardened.

The foregoing detailed description is provided for specific embodiments of the invention and should not be taken as limitations on the invention.

The invention claimed is:

1. A method of processing a thin film slider comprising the steps of:
   forming a thin film slider on a wafer;
   separating the thin film slider from the wafer to expose an air-bearing surface having a magnetic feature;
   applying a photoresist to the air-bearing surface;
   applying a magnetic field oriented perpendicular to the air-bearing surface;
   applying a liquid ferrofluid over the photoresist on the air-bearing surface to deposit ferrofluid material over the magnetic feature forming a ferrofluid mask on the photoresist over a first selected area above the magnetic feature;
   allowing the ferrofluid to dry;
   exposing the thin film slider to light;
   developing the photoresist;
   removing the photoresist outside of the ferrofluid mask to form a photoresist mask and to expose a second selected area of the air-bearing surface around the first selected area;
   milling the second selected area to form a recessed area around the first selected area; and
   removing the ferrofluid mask and photoresist mask.

2. The method of claim 1 wherein the step of applying the magnetic field further comprises positioning the slider over a permanent magnet.

3. The method of claim 1 further comprises a step of embedding the slider in a matrix of material in a carrier after the step of separating the slider from the wafer and before the step of applying the photoresist.

4. The method of claim 1 wherein the liquid ferrofluid is a colloidal suspension of opaque $Fe_2O_3$ particles.

5. The method of claim 1 wherein the liquid ferrofluid contains ferromagnetic particles with diameters of approximately 10 nm.

6. The method of claim 1 wherein the liquid ferrofluid contains ferromagnetic particles that are surface passivated.

7. The method of claim 1 wherein the liquid ferrofluid is a colloidal suspension including at least one of water, alcohol, or glycerin.

8. The method of claim 1 wherein the step of removing the ferrofluid mask and the photoresist mask further comprises first removing the ferrofluid mask using water or alcohol, then removing the photoresist mask by chemical stripping.

9. The method of claim 1 wherein the magnetic feature is a write head for perpendicular recording including a main pole, a write gap and a cap on a return pole piece.

10. The method of claim 1 wherein the step of milling the second selected area further comprises using ion-milling or reactive ion-etching.

11. A method of processing a thin film slider comprising the steps of:
   forming a thin film slider on a wafer;
   separating the thin film slider from the wafer to expose an air-bearing surface having a magnetic feature including a write head, the write head including a write gap on the exposed surface;
   applying a photoresist to the air-bearing surface;
   applying a magnetic field oriented perpendicular to the air-bearing surface;
   applying a liquid ferrofluid over the photoresist on the air-bearing surface to deposit opaque ferrofluid material over the write gap to form a ferrofluid mask on the photoresist over a first selected area above the write gap where there is a higher magnetic field gradient than a surrounding area;
   allowing the ferrofluid to dry;
   exposing the thin film slider to light;
   developing the photoresist;
   removing the photoresist outside of the ferrofluid mask to form a photoresist mask and to expose a second selected area of the air-bearing surface around the first selected area;
   milling the second selected area to form a recessed area around the first selected area so that the write gap protrudes above the surrounding area; and
   removing the ferrofluid mask and photoresist mask.

12. The method of claim 11 wherein the step of applying the magnetic field further comprises positioning the slider over a permanent magnet.

13. The method of claim 11 further comprises a step of embedding the slider in a matrix of material in a carrier after the step of separating the slider from the wafer and before the step of applying the photoresist.

14. The method of claim 11 wherein the liquid ferrofluid is a colloidal suspension of the $Fe_2O_3$ particles.

15. The method of claim 11 wherein the liquid ferrofluid contains ferromagnetic particles with diameters of approximately 10 nm.

16. The method of claim 11 wherein the liquid ferrofluid contains ferromagnetic particles that are surface passivated.

17. The method of claim 11 wherein the liquid ferrofluid is a colloidal suspension including at least one of water, alcohol, or glycerin.

18. The method of claim 11 wherein the step of removing the ferrofluid mask and the photoresist mask further comprises first removing the ferrofluid mask using water or alcohol, then removing the photoresist mask by chemical stripping.

19. The method of claim 11 wherein the magnetic feature is a write head for perpendicular recording including a main pole and a cap on a return pole piece adjacent to the write gap.

20. The method of claim 11 wherein the step of milling the second selected area further comprises using ion-milling or reactive ion-etching.

* * * * *